United States Patent [19]
Tokuda et al.

[11] Patent Number: 6,017,603
[45] Date of Patent: Jan. 25, 2000

[54] ULTRAVIOLET-CURING ADHESIVE COMPOSITION AND ARTICLE

[75] Inventors: Kiyohisa Tokuda, Urawa; Kenji Yoshida, Yono; Kazuhiko Ishii, Kawagoe; Minoru Yokoshima, Toride, all of Japan

[73] Assignee: Nippon Kayaku Kabushiki Kaisha, Tokyo, Japan

[21] Appl. No.: 08/981,576

[22] PCT Filed: Apr. 24, 1997

[86] PCT No.: PCT/JP97/01445

§ 371 Date: Dec. 22, 1997

§ 102(e) Date: Dec. 22, 1997

[87] PCT Pub. No.: WO97/40115

PCT Pub. Date: Oct. 30, 1997

[30] Foreign Application Priority Data

Apr. 28, 1995 [JP] Japan .................................. 7-127407
May 17, 1995 [JP] Japan .................................. 7-141429
Jun. 21, 1996 [JP] Japan .................................. 8-179878

[51] Int. Cl.$^7$ .............................. C08F 2/46; B32B 3/02; B32B 3/00
[52] U.S. Cl. .............................. 428/64; 522/96; 522/97; 522/90; 522/181; 522/182; 428/66; 428/913; 428/916; 428/927; 428/904; 428/910; 428/56; 428/60
[58] Field of Search .............................. 522/96, 97, 182, 522/181, 90

[56] References Cited

U.S. PATENT DOCUMENTS

| | | | |
|---|---|---|---|
| 4,557,813 | 12/1985 | Heil et al. | 204/159.14 |
| 4,559,118 | 12/1985 | Heil et al. | 204/159.14 |
| 4,560,456 | 12/1985 | Heil et al. | 204/159.14 |
| 4,835,027 | 5/1989 | Sudo et al. | 428/64 |
| 5,053,288 | 10/1991 | Hashimoto et al. | 428/694 |
| 5,118,548 | 6/1992 | Ohkubo et al. | 428/64 |
| 5,356,949 | 10/1994 | Komiyama et al. | 522/102 |
| 5,578,657 | 11/1996 | Inoue et al. | 522/92 |
| 5,585,201 | 12/1996 | Ha | 428/64.4 |
| 5,609,990 | 3/1997 | Ha et al. | 430/270.11 |
| 5,698,285 | 12/1997 | Kojima | 428/65.2 |

FOREIGN PATENT DOCUMENTS

| | | |
|---|---|---|
| 0 287 516 | 10/1988 | European Pat. Off. . |
| 0 361 978 | 4/1990 | European Pat. Off. . |
| 0 395 369 | 10/1990 | European Pat. Off. . |
| 2 289 472 | 11/1995 | European Pat. Off. . |
| 0 768 353 | 4/1997 | European Pat. Off. . |
| 63-284213 | 11/1988 | Japan . |
| 2-3132 | 1/1990 | Japan . |
| 3-33173 | 2/1991 | Japan . |
| 4-25614 | 5/1992 | Japan . |
| 05-125330 | 5/1993 | Japan . |
| 5-125330 | 5/1993 | Japan . |
| 8-127760 | 5/1996 | Japan . |
| 9-31416 | 2/1997 | Japan . |
| 94/08788 | 4/1994 | WIPO . |

OTHER PUBLICATIONS

Derwent Abstract for JP 03033173A: Near IR absorptive adhesive for optical fiber, Feb. 1991.
Derwent Abstract for JP05125330A: Photocuring adhesive for metal, ceramic and plastic parts, May 1993.
Derwent Abstract Accession No. 96–351919/35.
Derwent Abstract Accession No. 96–422031/42.
Derwent Abstract Accession No. 97/498368/46.
Copy of the Australian Search Report dated Jul. 1, 1999.

*Primary Examiner*—James J. Seidleck
*Assistant Examiner*—Sanza L. McClendon
*Attorney, Agent, or Firm*—Nield, Lemack & Dingman

[57] ABSTRACT

An ultraviolet-curable adhesive composition which comprises (A) a bisphenol type epoxy (meth)acrylate having a molecular weight of 450 to 3,000, (B) a urethane (meth)acrylate having a molecular weight of 400 to 10,000, (E) a (meth)acrylate monomer other than (A) and (B), and (F) a photopolymerization initiator, and an article having a cured layer of the above adhesive composition.

6 Claims, No Drawings

ULTRAVIOLET-CURING ADHESIVE COMPOSITION AND ARTICLE

TECHNICAL FIELD

This invention relates to an ultraviolet-curable adhesive composition, particularly to an adhesive composition for a lamination type optical disc which can be cured with an ultraviolet ray in the mutual bonding of (1) a substrate having a translucent film of an inorganic type such as gold, silver, silicon, a silicon compound or the like (referred to hereinafter as the translucent film), (2) a substrate having a metal-sputter film (referred to hereinafter as the metal sputter) of aluminum or the like and (3) a resin substrate of a polycarbonate type, a polyacrylate type, a polyvinyl type or the like and can maintain a sufficient bonding strength to the above three substrates (1) to (3).

BACKGROUND ART

In a single sided read system laminate type optical disc, a representative of which is a laminate type optical disc (referred to hereinafter as the laminate optical disc in some cases) such as DVD (digital video disc or digital versatile disc) or the like, it has heretofore been sufficient to bond (3) a resin substrate of a polycarbonate or the like to (2) a metal-sputter substrate. However, as to the laminate optical disc required to have a higher recording density, it has become an important technique to use a sheet of disc in the form of multilayer laminate. For recording information over the multilayer, it is necessary to additionally form, in addition to a conventional reflective film layer such as the metal sputter or the like, a layer composed of gold, silicon, a silicon compound or the like having functions of a reflecting layer and a light transmittable layer as a translucent film layer. That is to say, in a recent single sided read system multilayer type laminate optical disc, a representative of which is DVD-9 or DVD-18, it has been desired that the translucent film substrate (1) as well as the polycarbonate resin substrate and the metal-sputter substrate is also sufficiently laminated and bonded.

In bonding a film of gold, silver, silicon, a silicon compound or the like, the interface is inactive as compared with other inorganic matters, so that it has heretofore been considered to be difficult to impart chemical and physical actions effective to the bonding. As a result, the present situation is that no adhesive which is sufficiently satisfactory in performance and productivity has been provided for such reasons as no sufficient bonding strength being obtained in the bonding, a primer treatment being required, and the like.

With the conventional bonding method or adhesive, there are problems in respect of productivity in the optical disc lamination such as no sufficient bonding strength being obtained particularly as to the translucent film substrate (1) among the above-mentioned three substrates, a pretreatment such as a primer or the like being required, and the like, and the solution thereof has been desired.

DISCLOSURE OF INVENTION

The present inventors have eagerly made research for solving the above-mentioned problems and have consequently found that when (A) a bisphenol type epoxy (meth)acrylate having a molecular weight of 450 to 3,000, (B) a urethane (meth)acrylate having a molecular weight of 400 to 10,000 and (E) a (meth)acrylate monomer other than (A) and (B), and (F) a photopolymerization initiator are used, an ultraviolet-curable adhesive which can bond inactive substrates with a sufficient bonding strength, and have completed this invention.

That is to say, this invention relates to:

(1) an ultraviolet-curable adhesive composition which comprises (A) a bisphenol type epoxy (meth)acrylate having a molecular weight of 450 to 3,000, (B) a urethane (meth)acrylate having a molecular weight of 400 to 10,000, (E) a (meth)acrylate monomer other than (A) and (B), and (F) a photopolymerization initiator;

(2) the ultraviolet-curable adhesive composition of (1) above, wherein the urethane (meth)acrylate (B) has a polyester structure, a polyether structure or a polycarbonate structure;

(3) the ultraviolet-curable adhesive composition of (1) or (2) above which contains (C) a (meth)acrylate monomer having a cyclic structure as the (meth)acrylate monomer (E) other than (A) and (B);

(4) the ultraviolet-curable adhesive composition of (1) or (2) above which contains (C) a (meth)acrylate monomer having a cyclic structure and (D) an aliphatic (meth)acrylate monomer having a hydroxyl group as the (meth)acrylate monomer (E) other than (A) and (B);

(5) the ultraviolet-curable adhesive composition of any one of (1) to (4), wherein as the nonvolatile matter in the ultraviolet-curable adhesive, the bisphenol type epoxy (meth)acrylate (A) having a molecular weight of 450 to 3,000 is contained 5 to 70% by weight, the urethane (meth)acrylate (B) having a molecular weight of 400 to 10,000 is contained 5 to 60% by weight, the (meth)acrylate monomer (E) other than (A) and (B) is contained 10 to 80% by weight, and the photopolymerization initiator (F) is contained 0.01 to 20% by weight;

(6) the ultraviolet-curable adhesive composition of (5) above, wherein the (meth)acrylate monomer (E) other than (A) and (B) is composed of 100 to 30% by weight of (C) a (meth)acrylate monomer having a cyclic structure, 0 to 70% by weight of (D) an aliphatic (meth)acrylate monomer having a hydroxyl group, and 0 to 20% by weight of a (meth)acrylate monomer other than (C) and (D);

(7) the ultraviolet-curable adhesive composition of (5) above, wherein the (meth)acrylate monomer (E) other than (A) and (B) is composed of 95 to 30% by weight of (C) a (meth)acrylate monomer having a cyclic structure, 5 to 70% by weight of (D) an aliphatic (meth)acrylate monomer having a hydroxyl group, and 0 to 20% by weight of a (meth)acrylate monomer other than (C) and (D);

(8) an article having a layer composed of a cured product of the ultraviolet-curable adhesive composition of any one of (1) to (7);

(9) the article of (8) above which is an optical disc;

(10) the article of (9) above, wherein the optical disc is DVD; and

(11) the article of (10) above, wherein the DVD is a single sided read system double layer type DVD.

BEST MODE FOR CARRYING OUT THE INVENTION

The ultraviolet-curable adhesive composition of this invention comprises, as the essential components, (A) a bisphenol type epoxy (meth)acrylate having a molecular weight of 450 to 3,000, (B) a urethane (meth)acrylate having a molecular weight of 400 to 10,000, (E) a (meth)acrylate monomer other than (A) and (B), and (F) a photopolymerization initiator and can, if necessary, contain (G) a (meth)acrylate oligomer other than the above and (H) components such as a high molecular weight polymer, a solvent, various additives and the like. In the ultraviolet-curable adhesive composition of this invention, the presence of the component (A) and the component (B) allows the basic properties as an ultraviolet-curable adhesive to be exerted and the presence of the component (E) further enhances the basic properties.

The bisphenol type epoxy (meth)acrylate (A) having a molecular weight of 450 to 3,000 used in this invention is an epoxy (meth)acrylate obtained by the reaction of a bisphenol type epoxy resin with (meth)acrylic acid or a hydroxy(meth)acrylate. As the bisphenol type epoxy resin, there are mentioned, for example, bisphenol A type epoxy resins such as Epikote 828, Epikote 1001, Epikote 1004 and the like (these are all trade names of Yuka-Shell Epoxy Co., Ltd.); bisphenol F type epoxy resins such as Epikote 4001P, Epikote 4002P, Epikote 4003P (these are all trade names of Yuka-Shell Epoxy Co., Ltd.) and the like; etc. As preferable bisphenol type epoxy (meth)acrylates (A), there are mentioned bisphenol A type epoxy resins.

The urethane (meth)acrylate (B) having a molecular weight of 400 to 10,000 used in this invention is obtained by the reaction of an organic polyisocyanate with a hydroxy (meth)acrylate compound or the reaction of a polyol with an organic polyisocyanate and a hydroxy(meth)acrylate compound.

As the polyol, there are mentioned polyether polyols such as polypropylene glycol, polytetramethylene glycol and the like; polyester polyols obtained by the reaction of a polyhydric alcohol (as mentioned hereinafter) with a polybasic acid (for example, succinic acid, phthalic acid, hexahydrophthalic anhydride, terephthalic acid, adipic acid, azelaic acid, tetrahydrophthalic anhydride or the like); caprolactone polyols obtained by the reaction of a polyhydric alcohol (as mentioned hereinafter) with the above-mentioned polybasic acid and ε-caprolactone or the reaction of a polyhydric alcohol (as mentioned hereinafter) with ε-caprolactone; polycarbonate polyols (for example, a polycarbonate polyol obtained by the reaction of 1,6-hexanediol with a diphenyl carbonate, or the like); etc. Also, as the organic polyisocyanate, there are mentioned, for example, isophorone diisocyanate, hexamethylene diisocyanate, tolylene diisocyanate, xylene diisocyanate, diphenylmethane-4,4'-diisocyanate, dicyclopentanyl diisocyanate and the like. Particularly preferable components (B) are urethane (meth)acrylates having a polyester structure, a polyether structure or a polycarbonate structure obtained using, as the polyol, a polyester polyol, a polyether polyol, a polycaprolactone polyol, a polycarbonate polyol and the like.

As the above polyhydric alcohol, there are mentioned, for example, neopentyl glycol, ethylene glycol, diethylene glycol, propylene glycol, 1,6-hexanediol, 1,4-butanediol, trimethylolpropane, pentaerythritol, tricyclodecanedimethylol, bis(hydroxymethyl)cyclohexane and the like.

As the (meth)acrylate monomer (E) other than (A) and (B) used in this invention, there are preferred (C) (meth)acrylate monomers having a cyclic structure, for example, an aliphatic ring, an aromatic ring, a heterocyclic ring or the like and/or (D) aliphatic (meth)acrylate monomers having a hydroxyl group are preferred.

As the (meth)acrylate monomer component (C) having a cyclic structure, there are mentioned, for example, monomers having at least one (meth)acryloyl group in the molecule such as tricyclodecane (meth)acrylate, dicyclopentanyl (meth)acrylate, isobornyl (meth)acrylate, adamantyl (meth)acrylate, phenyl (meth)acrylate, benzyl (meth)acrylate, tetrahydrofurfuryl (meth)acrylate, morpholine acrylate, phenylglycidyl (meth)acrylate, and the like; polyfunctional monomers having at least two (meth)acryloyl groups in the molecule such as tris[(meth)acryloxyethyl] isocyanurate, caprolactone-modified tris[(meth)acryloxyethyl]isocyanurate, dicyclopentanyl di(meth)acrylate, tricyclodecanedimethylol di(meth)acrylate, hydropivalylaldehyde trimethylolpropane di(meth)acrylate and the like; etc. Also, the monomer having at least one (meth)acryloyl group in the molecule includes the above-mentioned monomer components (C) modified with an alkylene oxide, which is preferably used. In particular, those modified with an alkylene oxide having 2 to 3 carbon atoms are preferable, and there are mentioned, for example, dicyclopentadieneoxyethyl (meth)acrylate, phenyloxyethyl (meth)acrylate and the like.

As the aliphatic acrylate (D) having a hydroxyl group, particularly preferable are acrylate compounds having an aliphatic group having 2 to 9 carbon atoms, and furthermore, acrylate compounds having an aliphatic group having 2 to 4 carbon atoms are more preferable. There are mentioned monomers having one (meth)acryloyl group in the molecule such as 2-hydroxyethyl (meth)acrylate, 2-hydroxypropyl (meth)acrylate, 4-hydroxybutyl (meth)acrylate, 2-hydroxy-3-phenoxypropyl (meth)acrylate, ethylene oxide-modified phosphoric acid di(meth)acrylate, N-methylolacrylamide and the like; and polyfunctional monomers having at least two (meth)acryloyl groups in the molecule such as pentaerythritol tri(meth)acrylate, glycerol di(meth)acrylate, triglycerol di(meth)acrylate, epichlorohydrin-modified phthalic acid di(meth)acrylate, epichlorohydrin-modified 1,6-hexanediol di(meth)acrylate, epichlorohydrin-modified propylene glycol di(meth)acrylate, epichlorohydrin-modified ethylene glycol di(meth)acrylate, epichlorohydrin-modified glycerol tri(meth)acrylate, epichlorohydrin-modified trimethylolpropane tri(meth)acrylate, ethylene oxide-modified phosphoric acid di(meth)acrylate and the like.

As the (meth)acrylate monomer (E) other than the above-mentioned (C) and (D), there are mentioned monofunctional acrylate compounds, for example, 2-methoxyethyl (meth)acrylate, 3-methoxybutyl (meth)acrylate, methoxytriethylene glycol (meth)acrylate, butoxyethyl (meth)acrylate, methoxydipropylene glycol (meth)acrylate, diacetone (meth)acrylamide, N-n-butoxymethyl (meth)acrylamide, and the like; difunctional (meth)acrylate compounds of aliphatic diols having 4 to 9 carbon atoms, for example, neopentyl glycol di(meth)acrylate, 1,6-hexanediol di(meth)acrylate and the like; or modified compounds thereof which are difunctional (meth)acrylate compounds of polyether type polyols having 8 to 46 carbon atoms, for example, neopentyl glycol hydroxypivalic acid di(meth)acrylate, neopentyl glycol-modified trimethylolpropane di(meth)acrylate, polyethylene glycol di(meth)acrylate, tripropylene glycol di(meth)acrylate, and the like; trifunctional or more functional (meth)acrylate compounds, for example, trimethylolpropane tri(meth)acrylate, pentaerythritol tri(meth)acrylate, $C_2$–$C_5$ aliphatic hydrocarbon-modified trimethylolpropane tri(meth)acrylates, $C_2$–$C_5$ aliphatic hydrocarbon-modified dipentaerythritol penta(meth)acrylates, $C_2$–$C_5$ aliphatic hydrocarbon-modified dipentaerythritol tetra (meth)acrylates, dipentaerythritol hexa(meth)acrylate, caprolactone-modified dipentaerythritol hexa(meth)

acrylate, pentaerythritol tetra(meth)acrylate, ditrimethylolpropane tetra(meth)acrylate and the like.

The (meth)acrylate monomer (E) other than (A) and (B) is used mainly for further improving the adhesiveness. For example, for improving the adhesiveness to a plastic product such as a substrate for an optical disc or the like, it is preferable to use the (meth)acrylate monomer (C) having a cyclic structure, and for improving the adhesiveness to the translucent film or metal, it is preferable to use the aliphatic (meth)acrylate monomer (D) having a hydroxyl group. Furthermore, it is preferable to use, if necessary, a (meth) acrylate monomer other than (C) and (D).

As to the proportions of these components used, the (meth)acrylate monomer (C) having a cyclic structure is preferably about 100 to 30% by weight, more preferably 100 to 50% by weight, and further preferably about 100 to 65% by weight; the aliphatic (meth)acrylate monomer (D) having a hydroxyl group is preferably about 0 to 70% by weight, more preferably about 0 to 50% by weight, and further preferably about 0 to 35% by weight; and the (meth)acrylate monomer other than (C) and (D) is preferably about 0 to 20% by weight, more preferably about 0 to 15% by weight, and further preferably about 0 to 10% by weight.

Incidentally, when the aliphatic (meth)acrylate monomer (D) having a hydroxyl group is used as an essential component, the proportion of the same used is preferably about 5 to 70% by weight, more preferably about 10 to 50% by weight, and further preferably about 15 to 35% by weight, and the proportion of the component (C) used and the proportion of the (meth)acrylate monomer other than (C) and (D) used are the same as mentioned above.

As the (meth)acrylate monomer (G) which may be used in addition to the above [referred to hereinafter as the oligomer component (G) in some cases], there are mentioned polyester (meth)acrylates obtained by the reaction of polyester polyols with (meth)acrylic acid, and the like. The polyester polyol is obtained by the reaction of a polyhydric alcohol with a polybasic acid. As the polyhydric alcohol, there are mentioned, for example, neopentyl glycol, ethylene glycol, propylene glycol, 1,6-hexanediol, trimethylolpropane, pentaerythritol, tricyclodecanedimethylol, bis (hydroxymethyl)cyclohexane and the like. As the polybasic acid, there are mentioned, for example, succinic acid, phthalic acid, hexahydrophthalic anhydride, terephthalic acid, adipic acid, azelaic acid, tetrahydrophthalic anhydride and the like. This oligomer component (G) is used, for example, when it is necessary to adjust the viscosity of a resin solution and improve the flexibility and the like after the curing.

As the photopolymerization initiator (F) used in this invention, there are mentioned, for example, 1-hydroxycyclohexyl phenyl ketone, (1-6-η-cumene)(η-cyclopentadienyl)iron(1+) hexafluorophosphoric acid(1−), 2,2-dimethoxy-2-phenylacetophenone, 2-methyl-[4-(methylthio)phenyl]-2-morpholino-1-propanone, 2-benzyl-2-dimethylamino-1-(4-morpholinophenyl)butanone-1,2-chlorothioxanthone, 2,4-dimethylthioxanthone, 2,4-diisopropylthioxanthone, isopropylthioxanthone, 2,4,6-trimethylbenzoyldiphenylphosphine oxide, bis(2,6-dimethoxybenzoyl)-2,4,4-trimethylpentylphosphine oxide and the like. As particularly preferable photopolymerization initiators, there are mentioned compounds having an absorption wave length of not less than 360 nm but not more than 450 nm and a molar extinction coefficient of not less than 400, for example, 2-benzyl-2-dimethylamino-1-(4-morpholinophenyl)butanone-1,2-chlorothioxanthone, 2,4-dimethylthioxanthone, 2,4-diisopropylthioxanthone, isopropylthioxanthone, 2,4,6-trimethylbenzoyldiphenylphosphine oxide, bis(2,6-dimethoxybenzoyl)-2,4,4-trimethylpentylphosphine oxide and the like. These photopolymerization initiators may be used alone or in admixture of two or more in any proportion.

The above-mentioned components are used as the nonvolatile matter in the ultraviolet-curable adhesive composition of this invention so that the bisphenol A type epoxy (meth)acrylate (A) having a molecular weight of 450 to 3,000 is contained preferably about 5 to 70% by weight, more preferably about 10 to 50% by weight, and further preferably about 10 to 30% by weight; the urethane (meth) acrylate (B) having a molecular weight of 400 to 10,000 is contained preferably about 5 to 60% by weight, more preferably about 20 to 60% by weight, and further preferably about 30 to 50% by weight; the (meth)acrylate monomer (E) other than (A) and (B) is contained preferably about 10 to 80% by weight, more preferably about 20 to 70% by weight, and further preferably about 30 to 50% by weight; the photopolymerization initiator (F) is contained preferably about 0.01 to 20% by weight, more preferably about 1 to 15% by weight, and further preferably about 3 to 10% by weight, and the (meth)acrylate oligomer (G) other than the above is contained preferably about 0 to 30% by weight, more preferably about 0 to 20% by weight, and further preferably about 0 to 10% by weight.

In this invention, if necessary, a photopolymerization initiating coagent such as an amine or the like can be used. As the photopolymerization initiating coagent, there are mentioned, for example, 2-dimethylaminoethyl benzoate, dimethylaminoacetophenone, ethyl p-dimethylaminobenzoate, isoamyl p-dimethylaminobenzoate, and the like. The amount of the photopolymerization initiating coagent used is usually preferably 0 to 15% by weight, further preferably about 0 to 10% by weight, based on the components obtained by removing volatile matters such as solvent and the like from the composition.

Moreover, in this invention, if necessary, component (H) such components as a high molecular weight polymer, an organic solvent, various additives and the like can be used. As the high molecular weight polymer, there can be used, for example, polyester type resins, polycarbonate type resins, polyacrylate type resins, polyurethane type resins, polyvinyl type resins and the like. As the organic solvent, there are mentioned toluene, xylene, methyl ethyl ketone, isopropanol, diethylene glycol monoethyl ether acetate, diethylene glycol monobutyl ether, diethylene glycol monobutyl ether acetate, diethylene glycol mono-, di-ethyl ether and the like. As the various additives, there are mentioned, for example, silane-coupling agent, polymerization inhibitor, leveling agent, surface lubricant, defoaming agent, light stabilizer, antioxidant, antistatic agent, filler and the like. As the silane-coupling agent, there are mentioned alkyl type, amine type, (meth)acrylate type, isocyanate type, epoxy type, thiol type and the like. As the polymerization inhibitor, there are mentioned metoquinone, methylhydroquinone and the like. As the leveling agent, surface lubricant and defoaming agent, there are mentioned organic polymer type, silicon type, fluorine type and the like. As the antioxidant, there are mentioned hindered amine type, hindered phenol type, high molecular weight phenol type and the like. As the antistatic agent, there are mentioned quaternary ammonium salt type, polyether type, electroconductive powder and the like. As the filler, there are mentioned silica gel, titanium oxide, alumina, electroconductive powder and the like. Theses components are used, for example, when it is necessary to adjust the viscosity of a resin solution and improve the flexibility and the like after the curing.

The adhesive composition of this invention can be obtained by mixing and dissolving the above-mentioned components at room temperature to 80° C. using an organic solvent or without using an organic solvent. The cured product of the composition of this invention can be obtained by irradiation with a ray such as an ultraviolet ray, a visible light laser or the like in the conventional manner. The curing of the adhesive composition of this invention by irradiation with a ray such as an ultraviolet ray or the like is specifically conducted by irradiation with an ultraviolet ray using a low pressure or high pressure mercury lamp, a metal halide lamp, a xenone lamp or the like.

The adhesive composition of this invention is useful as an adhesive for bonding the metal-sputter surface of the metal-sputter-treated substrate (2) as one adherend to the translucent film surface of the translucent film-treated substrate (1) or the surface of the resin substrate (3) of a polycarbonate or the like as the other adherend. Moreover, it is also useful as an adhesive for bonding the translucent film surfaces of the translucent film-treated substrate (1) to each other, the metal-sputter surfaces of the metal-sputter-treated substrate (2) to each other or the resin substrates (3) of a polycarbonate or the like to each other. The materials of the above substrates (1) to (3) are not particularly limited in shape of substrate as far as they are substrates based on a resin, for example, a polyvinyl type resin, a polycarbonate type resin, a polyacrylate type resin, an amorphous polyolefin type or the like, and, for example, either plate-like substrate or film-like substrate can be applied.

The article of this invention has a layer composed of a cured product of the above-mentioned ultraviolet-curable adhesive composition, and examples thereof include optical disc, IC card, ID card, optical card and the like. A more preferable article is DVD, particularly the laminate optical disc, a representative of which is a single sided read system double layer type DVD.

The article of this invention can be obtained, for example, by coating or placing a given amount of the ultraviolet-curable adhesive composition of this invention on any one of the above substrates (1) to (3) or, particularly in the case of a single sided read system double layer type DVD, on either the metal-sputter surface of the metal-sputter-treated substrate (2) or the translucent film surface of the translucent film-treated substrate (1), thereafter sandwiching the ultraviolet-curable adhesive in between the above substrate and another substrate with its metal-sputter surface or translucent film surface inside and irradiating the assembly with an ultraviolet ray from above either of the substrates to cure the ultraviolet-curable adhesive of this invention, thereby bonding the substrates to each other. In the case of a double sided read system DVD, it is sufficient to coat or place a given amount of the ultraviolet-curable adhesive of this invention on the metal-sputter surface of the metal-sputter-treated substrate (2) and thereafter sandwich the ultraviolet-curable adhesive in between the above substrate and the metal-sputter surface of another metal-sputter-treated substrate (2) and then bond the substrates to each other in the same manner as above. In these methods, if necessary, the curing can be effected with a visible light laser in place of the ultraviolet ray. As a coating means, there are mentioned a roll coater, a spin coater, a means for a 2P method, a screen printer and the like. Incidentally, the 2P method means a method in which an adhesive is dropped onto one of the substrates and the other substrate to be bonded is pressed to bond them.

The film thickness of the cured layer is preferably 1 to 200 μm, more preferably 10 to 150 μm, and further preferably about 30 to 100 μm. Incidentally, it is needless to say that even when the metal-sputter surface of the metal-sputter-treated substrate (2) is bonded to a substrate which has not been subjected to translucent or opaque treatment, this invention can be applied.

Incidentally, the single sided read system double layer type DVD utilizes the properties of a translucent film layer that it transmits or reflects a laser depending upon the focus of light pickup and is called DVD-9 (an article formed by laminating two sheets thereof is called DVD-18), and usually used as ROM (read only memory). This is obtained by bonding a DVD substrate in which the information-writing surface of an information-written transparent substrate (made of, for example, a polycarbonate) has been subjected to metal-sputter-treatment to another DVD substrate in which a translucent film layer has been provided on the information-writing surface of a transparent substrate (made of, for example, a polycarbonate) to which information has been written similarly, in such a manner that the metal-sputter-treated surface and the translucent layer surface face each other. As the metal of the metal sputter, for example, aluminum is mentioned, and as the translucent film, there are mentioned thin films of, for example, gold, silver, silicon, a silicon compound and the like.

This invention is more specifically explained below by Examples. Incidentally, the term "part" in the Examples means part by weight.

EXAMPLES 1 to 5 and COMPARATIVE EXAMPLE 4

Among the components shown in Table 1, the resin components were dissolved with stirring at 60° C. in one hour. Thereafter, the photopolymerization initiator and others were added to prepare ultraviolet-curable adhesive compositions for Examples 1 to 5 and Comparative Examples 1 to 4. Each of the compositions obtained was coated on the adhesive surface of one of the substrates [the translucent film surface of a polycarbonate substrate (1) treated with a gold film as a translucent film, the metal-sputter surface of a polycarbonate substrate (2) sputter-treated with aluminum as a metal or the surface of a polycarbonate resin substrate (3)] in a coating thickness of about 50 μm, this coated surface was intimately contacted with the adhesive surface of the other substrate [the translucent film surface of (1), the metal-sputter surface of (2) or the resin substrate surface of (3)], and the composition was cured in a curing apparatus provided with a high pressure mercury lamp (80 w/cm) to bond the substrates to each other. Thereafter, the substrates bonded were peeled and the surface state thereof was observed. The results of the observation are shown in Table 1.

Incidentally, the abbreviation of each composition shown in the Table is as mentioned below. Incidentally, the numerical values in the Table are parts by weight.

EPA-1: Bisphenol A type epoxy acrylate manufactured by NIPPON KAYAKU CO., LTD.
UX-2301: Polyether type urethane acrylate manufactured by NIPPON KAYAKU CO., LTD.
UX-4101: Polyester type urethane acrylate manufactured by NIPPON KAYAKU CO., LTD.
M-1200: Polyester type urethane acrylate manufactured by TOAGOSEI CHEMICAL INDUSTRY CO., LTD.
M-315: Tris(acryloxyethyl)isocyanurate manufactured by TOAGOSEI CHEMICAL INDUSTRY CO., LTD.

MANDA: Hydropivalic acid neopentyl glycol diacrylate manufactured by NIPPON KAYAKU CO., LTD.

HDDA: 1,6-Hexanediol diacrylate manufactured by NIPPON KAYAKU CO., LTD.

R-561: Phenyloxyethyl acrylate manufactured by NIPPON KAYAKU CO., LTD.

FA-513A: Tricyclodecane acrylate manufactured by Hitachi Chemical Co., Ltd.

TC-101: Tetrahydrofurfuryl acrylate manufactured by NIPPON KAYAKU CO., LTD.

HO: 2-Hydroxyethyl methacrylate manufactured by Kyoeisha Kagaku K. K.

PM-2: Bis(2-methacryloyloxyethyl)phosphate manufactured by NIPPON KAYAKU CO., LTD.

DETX: 2,4-Diethylthioxanthone, a photopolymerization initiator manufactured by NIPPON KAYAKU CO., LTD.

Irg-184: 1-Hydroxycyclohexyl phenyl ketone, a photopolymerization initiator manufactured by CIBA GEIGY Corp.

Irg-1800: Mixture of Irg-184 with bis(2,6-dimethoxybenzoyl)-2,4,4-trimethylpentylphosphine oxide, a photopolymerization initiator manufactured by CIBA GEIGY Corp.

TPO: 2,4,6-Trimethylbenzoyldiphenylphosphine oxide, a photopolymerization initiator manufactured by BASF DMBI: Isoamyl p-dimethylaminobenzoate, a photopolymerization initiating coagent manufactured by NIPPON KAYAKU CO., LTD.

TABLE 1

| | Resin | Example 1 | 2 | 3 | 4 | 5 | Comparative Example 1 | 2 | 3 | 4 |
|---|---|---|---|---|---|---|---|---|---|---|
| A | EPA-1 | 30 | 20 | 20 | 30 | 40 | 40 | — | — | 50 |
| B | UX-4101 | 20 | — | 30 | 20 | — | — | 35 | 35 | — |
| | UX-2301 | — | — | — | 10 | — | — | — | — | — |
| | M-1200 | — | 20 | — | — | 20 | — | — | — | — |
| E C | M-315 | — | 20 | — | — | — | 10 | — | — | — |
| | R-561 | — | — | — | — | 30 | — | 49 | — | 30 |
| | FA-513A | 50 | — | — | — | — | — | — | — | — |
| | TC-101 | — | 40 | 20 | 20 | — | 40 | — | — | — |
| D | HEMA | — | — | 10 | 20 | — | 10 | — | 20 | — |
| | PM-2 | — | — | — | — | — | — | — | — | 10 |
| | MANDA | — | — | 20 | — | — | — | — | 25 | — |
| | HDDA | — | — | — | — | — | — | 25 | 20 | 20 |
| F | DETX | — | 5 | — | — | — | — | — | — | — |
| | Irg-184 | 3 | — | 5 | 5 | 5 | — | 7 | — | 5 |
| | Irg-1800 | 3 | — | 2 | 1 | 1 | — | — | — | — |
| | TPO | — | — | — | — | — | 5 | — | 5 | 5 |
| | DMBI | — | 3 | — | — | — | — | — | — | — |
| Substrate/ Substrate | | Adhesiveness | | | | | | | | |
| (1)/(3) | | ○ | ○ | ○ | ○ | ○ | ○ | × | × | ○ |
| (2)/(3) | | ○ | ○ | ○ | ○ | ○ | ○ | × | Δ | ○ |
| (3)/(3) | | ○ | ○ | ○ | ○ | ○ | × | ○ | Δ | × |
| (1)/(2) | | ○ | ○ | ○ | ○ | ○ | Δ | × | × | Δ |

○: The sputter film or the gold thin film was completely peeled from the polycarbonate plate (substrate) and in the peeling, breakage of substrate was caused or the polycarbonate plate was broken.
Δ: The sputter film or the gold thin film was partly peeled from the polycarbonate plate, and a wrinkle-like crack was caused on the peeling surface or a wrinkle-like crack was caused on the peeling surface of the polycarbonate plate.
×: The sputter film or the gold thin film remained on the polycarbonate plate, or the polycarbonate plates were simply peeled from each other.

As is clear from Table 1, the compositions in Examples 1 to 5 are good in adhesiveness as compared with the adhesives in Comparative Examples 1 to 4, and in use for a single sided read system laminate optical disc in which an information-recording layer has been laminated, a representative of which is DVD, the compositions are useful as ultraviolet-curable adhesives suitable for bonding the resin substrates (3) of a polycarbonate or the like to each other, the metal-sputter-treated substrates (2) to each other and the translucent film-treated substrates (1) to each other.

The ultraviolet-curable adhesive composition of this invention, in a laminate type optical disc such as DVD or the like, is cured with an ultraviolet ray in the bonding of the translucent film-treated substrates (1) provided with a thin film of gold, silver, silicon, a silicon compound or the like, the substrates (2) treated with a metal-sputter film such as aluminum or the like and the resin substrates (3) of a polycarbonate or the like to each other, whereby the properties as an optical disc are kept, so that the composition is good in balance and is such an adhesive that the above three substrates (1) to (3) can keep a sufficient bonding strength, and hence, is very useful from the viewpoint of adhesiveness, protection and productivity of a laminate optical disc, particularly a DVD-ROM in which the translucent film-treated substrate and the metal-sputter film-treated substrate have been laminated.

The present application is based on International Application PCT/JP96/01134 filed Apr. 25, 1996 and Patent Application No. 8-179,870 filed Jun. 21, 1996 in Japan, and the contents thereof are as a whole incorporated by reference into the present specification.

In the United States which is one of the designated countries, the present application is a continuation-in-part application of U.S. patent application Ser. No. 08/765,016 filed Dec. 19, 1996, and the contents of the specification thereof are, as a whole, incorporated by reference into the present specification.

We claim:

1. A DVD having a layer composed of a cured product of the ultraviolet-curable adhesive composition which comprises (A) a bisphenol epoxy (meth)acrylate having a molecular weight of 450 to 3,000, (B) a urethane (meth)acrylate having a molecular weight of 400 to 10,000, (E) a (meth)acrylate monomer other than (A) and (B), and (F) a photo polymerization initiator;

wherein said (meth)acrylate (E) other than (A) and (B) comprises (C) a (meth)acrylate monomer having a cyclic structure;

as the nonvolatile matter in the ultraviolet-curable adhesive, the bisphenol epoxy (meth)acrylate (A) having a molecular weight of 450 to 3,000 is present in an amount of 5 to 70% by weight, the urethane (meth)acrylate (B) having a molecular weight of 400 to 10,000 is present in an amount of 5 to 60% by weight, the (meth)acrylate monomer (E) other than (A) and (B) is present in an amount of 10 to 80% by weight, and the photopolymerization initiator (F) is present in an amount of 3 to 20% by weight; and said photolpolymerization initiator has an absorption wave length of not less than 360 nm but not more than 450 nm and a molar extinction coefficient of not less than 400.

2. The DVD of claim 1, wherein the ultraviolet-curable adhesive composition comprises, wherein the urethane (meth)acrylate (B) has a polyester structure, a polyether structure or a polycarbonate structure.

3. The DVD of claim 1, wherein the ultraviolet-curable adhesive composition comprises, which comprises (C) a (meth)acrylate monomer having a cyclic structure and (D) an aliphatic (meth)acrylate monomer having a hydroxyl group as the (meth)acrylate monomer (E) other than (A) and (B).

4. The DVD of claim 1, wherein the ultraviolet-curable adhesive composition comprises, wherein the (meth)acrylate monomer (E) other than (A) and (B) is composed of 100 to 30% by weight of (C) a (meth)acrylate monomer having a cyclic structure, 0 to 70% by weight of (D) an aliphatic (meth)acrylate monomer having a hydroxyl group and 0 to 20% by weight of a (meth)acrylate monomer other than (C) and (D).

5. The DVD of claim 1, wherein the ultraviolet-curable adhesive composition comprises, wherein the (meth)acrylate monomer (E) other than (A) and (B) is composed of 95 to 30% by weight of (C) a (meth)acrylate monomer having a cyclic structure, 5 to 70% by weight of (D) an aliphatic (meth)acrylate monomer having a hydroxyl group and 0 to 20% by weight of a (meth)acrylate monomer other than (C) and (D).

6. An article having a layer composed of a cured product of the ultraviolet-curable adhesive composition according to any of claims 1–5, wherein the DVD is a single sided read system double layer DVD.

* * * * *

UNITED STATES PATENT AND TRADEMARK OFFICE
CERTIFICATE OF CORRECTION

PATENT NO. : 6,017,603
DATED : January 25, 2000
INVENTOR(S) : Kiyoshi Tokuda, et al.

It is certified that error appears in the above-identified patent and that said Letters Patent is hereby corrected as shown below:

[30] Foreign Application Priority Data

"8-179878" should read --8-179870--

Please add the following:

-- Related U.S. Application Data

[60] U.S. Serial No: 08/765,016, December 19, 1996--

Signed and Sealed this

Third Day of April, 2001

Attest:

NICHOLAS P. GODICI

Attesting Officer

Acting Director of the United States Patent and Trademark Office